United States Patent
Tseng et al.

(10) Patent No.: US 7,376,099 B2
(45) Date of Patent: May 20, 2008

(54) METHODS AND SYSTEMS OF DYNAMIC CHANNEL ALLOCATION FOR ACCESS POINTS IN WIRELESS NETWORKS

(75) Inventors: Yu-Chee Tseng, Hsinchu (TW); Chih-Yu Lin, Taipei (TW); Bing-Rong Lin, Taipei (TW)

(73) Assignee: Institute for Information Industry, Taipei (TW)

( * ) Notice: Subject to any disclaimer, the term of this patent is extended or adjusted under 35 U.S.C. 154(b) by 596 days.

(21) Appl. No.: 11/025,457

(22) Filed: Dec. 29, 2004

(65) Prior Publication Data

US 2006/0109799 A1    May 25, 2006

(30) Foreign Application Priority Data

Nov. 25, 2004    (TW) .................. 93136282 A

(51) Int. Cl.
*H04Q 7/00* (2006.01)
(52) U.S. Cl. .................. 370/329; 370/341; 370/254; 455/450; 455/452.2
(58) Field of Classification Search .......... 370/252, 370/254, 255, 256, 258, 329, 330, 341; 455/23, 455/25, 450, 452.1, 452.2, 512, 509; 379/1
See application file for complete search history.

(56) References Cited

U.S. PATENT DOCUMENTS

| | | | | |
|---|---|---|---|---|
| 5,570,411 | A | * | 10/1996 | Sicher .................. 455/450 |
| 6,985,465 | B2 | * | 1/2006 | Cervello et al. ............ 370/333 |
| 2002/0176437 | A1 | * | 11/2002 | Busch et al. ................ 370/437 |
| 2005/0122999 | A1 | * | 6/2005 | Scherzer et al. ............ 370/480 |
| 2005/0227624 | A1 | * | 10/2005 | Hiddink et al. ............... 455/62 |

FOREIGN PATENT DOCUMENTS

| | | |
|---|---|---|
| JP | 2003032268 | 1/2003 |
| JP | 2004207839 | 7/2004 |

OTHER PUBLICATIONS

JP Office Action mailed Sep. 11, 2007.

* cited by examiner

*Primary Examiner*—Edan Orgad
*Assistant Examiner*—Chuong Ho
(74) *Attorney, Agent, or Firm*—Thomas, Kayden, Horstemeyer & Risley

(57) ABSTRACT

A method for dynamic channel allocation for access points in wireless networks. Communication information of wireless devices is gathered. A network topology formed by the wireless devices is derived according to the communication information. Switch channel indexes for each wireless device are calculated according to the communication information and network topology. Desired wireless devices for switching channels are determined according to the switch channel indexes.

12 Claims, 9 Drawing Sheets

METHODS AND SYSTEMS OF DYNAMIC CHANNEL ALLOCATION FOR ACCESS POINTS IN WIRELESS NETWORKS

BACKGROUND

The invention relates to wireless communication protocols, and more particularly, to methods of dynamic channel allocation for access points in wireless networks.

In conventional wireless local area network (WLAN) environments complying with Institute of Electrical and Electronic Engineers (IEEE) 802.11 communication standards, to enhance communication ability and accommodate a greater number of mobile hosts (MH), multiple access points (AP) are located in a communication area, for example, in a schools building or airport, such that a mobile host anywhere in the building can receive wireless signals. Network administrators statically deploy network access points and allocate communication channels therefor, manually deriving communication channels for each access point, such that signal interference between access points is minimized, and communication channels allocated to access points will not be reallocated. Access points described herein serve as bridges in wireless networks, connecting conventional wired LANs and wireless LANs, such that a personal computer equipped with an wireless card can share resources from LANs or wide area networks (WANs). Additionally, access points provide network management functions, controlling and managing personal computers connected thereto via wireless cards.

The number of available communication channels is limited in that many access points use identical or adjacent channels if a considerable number of access points are located in the same area, resulting in signal interference if two neighboring access points use identical or adjacent channels. However, mobile hosts may not equally associate with each access point. If there is no mobile host which associates with one of two adjacent access point and is present in the signal coverage of the access points, the two access points can use the same channel and it may reduce the possibility of signal interference caused by access points with high channel load. Referring to FIG. 1A, both access points AP1 and AP4 are allocated communication channel C1, access point AP2 is allocated communication channel C6, and access point AP3 is allocated communication channel C11. Mobile host MH6 associates with access point AP1, mobile hosts MH7~MH11 associate with access point AP2, mobile hosts MH12~MH14 associate with access point AP3, and mobile hosts MH15 and MH16 associate with access point AP4. Referring to FIG. 1B, when mobile hosts MH7~MH11 disassociate with access point AP2 and associate with access point AP1, the possibility of signal interference between access points AP1 and AP4 may increase due to the channel load of access point AP1 increase and the same communication channel to access point AP4.

Thus, a method for dynamic channel allocation for access points in wireless networks is desirable.

SUMMARY

Systems of dynamic channel allocation for access points in wireless networks, comprising a plurality of wireless devices, each allocated a communication channel, are provided. An embodiment of such a system comprises an allocating server, gathering communication information of each wireless device, deriving a network topology formed by the wireless devices according to the communication information, calculating switch channel indexes for the each wireless device according to the communication information and network topology, and determining desired wireless devices for switching channels according to the switch channel indexes.

Also disclosed is another system of dynamic channel allocation for access points in wireless networks, comprising at least one first, second, third, and fourth wireless devices, each allocated a first, second, third, and fourth communication channels respectively, in which the first, third, and fourth communication channels do not interfere with each other and the first communication channel is identical to the second communication channel. An embodiment of such a system comprises an allocating server, connecting to the wireless devices through a hub, gathering communication information of each wireless device, deriving a network topology formed by the wireless devices according to the communication information, calculating a first, second, third, and fourth switch channel indexes for the each wireless device according to the communication information and network topology, and, when the first switch channel index (SCI) is greater than an SCI threshold, allocating the third or fourth communication channel to the first wireless device.

Further disclosed are methods of dynamic channel allocation for access points in wireless networks, comprising a plurality of wireless devices, each allocated a communication channel. In an embodiment of such a method, communication information of each wireless device is gathered. A network topology formed by the wireless devices is derived according to the communication information. Switch channel indexes for each wireless device are calculated according to the communication information and network topology. Desired wireless devices for switching channels are determined according to the switch channel indexes.

BRIEF DESCRIPTION OF THE DRAWINGS

Systems and methods of dynamic channel allocation for access points in wireless networks can be more fully understood by reading the subsequent detailed description and examples of embodiments thereof with reference made to the accompanying drawings, wherein.

DETAILED DESCRIPTION

Figure 1A:
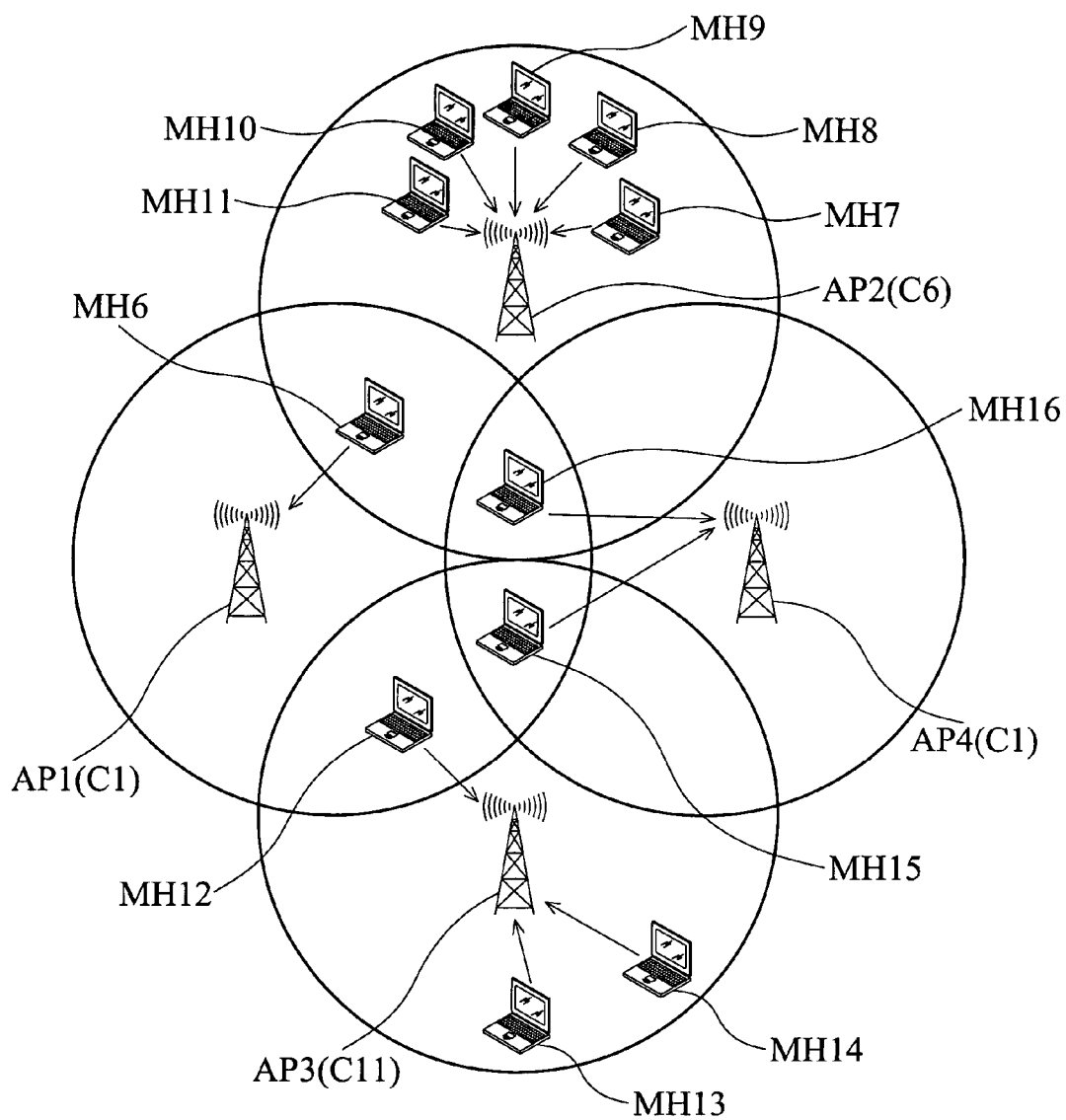
FIGS. 1A and 1B are schematic views of conventional channel allocation for access points.

Embodiments of the invention disclose methods and systems of dynamic channel allocation for access points in wireless networks. Several exemplary embodiments of the invention will now be described with reference to FIGS. 2 through 5, which generally relate to channel allocation for access points.

US Patent Publication No. 20020060995 discloses "Dynamic channel selection scheme for IEEE 820.11 WLANs", disclosure thereof has a portion similar to the invention, description thereof is provided in the following.

Disclosed is a method and system for dynamically selecting a communication channel between an access point (AP) and a plurality of stations (STAs) in an IEEE 802.11 wireless local area network (WLAN). The method includes the steps of: determining whether a new channel between the AP and STAs within a particular basic service set (BSS) is needed; requesting some of the plurality of stations to measure the channel signal quality by the AP; reporting a channel signal quality report back to the AP based on a received signal strength indication (RSSI) and a packet error rate (PER) of all channels detected by the stations within the BSS; selecting a new channel based on the channel quality report for use in communication between the AP and the plurality of stations.

Characteristics of the invention, however, are essentially different from the disclosed invention. The invention exchanges messages between multiple access points in a wireless network and determines available channels for each access point. Additionally, an access point can switch to an available channel at an appropriate time. Herein, channel utilization relates to interference between access points and the load thereof, distinct from the above disclosure.

Embodiments of dynamic channel allocation for access points are in the following.

IEEE 802.11b communication standards use the frequency of 2.4 GHz and allow regulatory bodies to define different required frequency ranges, comprising 2.4 GHz~2.4835 GHz, 2.4465 GHz~2.4835 GHz, 2.445 GHz~2.475 GHz, and others. Further, a frequency range comprises multiple available channels, in which the frequency range of 2.4 GHz~2.4835 GHz comprises 11 available channels, 2.4465 GHz~2.4835 GHz comprises 4 available channels, and 2.445 GHz~2.475 GHz comprises 2 available channels. Additionally, interference may occur between channels due to signal coverage of a channel overlapping another channel. In the frequency range of 2.4 GHz~2.4835 GHz comprising 11 available channels, in which the $1^{st}$, $6^{th}$, and $11^{th}$ channels can be allocated to access points for preventing signal interference. The three channels as example but are not intended to limit the invention thereto. In practice, purposes thereof can be achieved using channels with little or no interference.

Additionally, IEEE 802.11b communication standards provide two operation modes, comprising an ad hoc mode and infrastructure mode. An ad hoc network is a collection of wireless mobile hosts forming a temporary network without the aid of any established infrastructure or centralized administration. In such an environment, it may be necessary for one mobile host to enlist the aid of other hosts in forwarding a packet to its destination, due to the limited range of each mobile host's wireless transmissions. In an infrastructure network, a base station, gateway, or router usually acts as a central point between two or more wireless devices. Often these devices will share a broadband Internet connection. Each wireless device must have an adapter that can associate with the base station or another available wireless access point. As described above, such an infrastructure structure typically exists in a school building or airport. Embodiments of the invention solve channel allocation problems occurring in the mentioned infrastructure, but are not intended to limit the invention thereto.

Figure 2A:
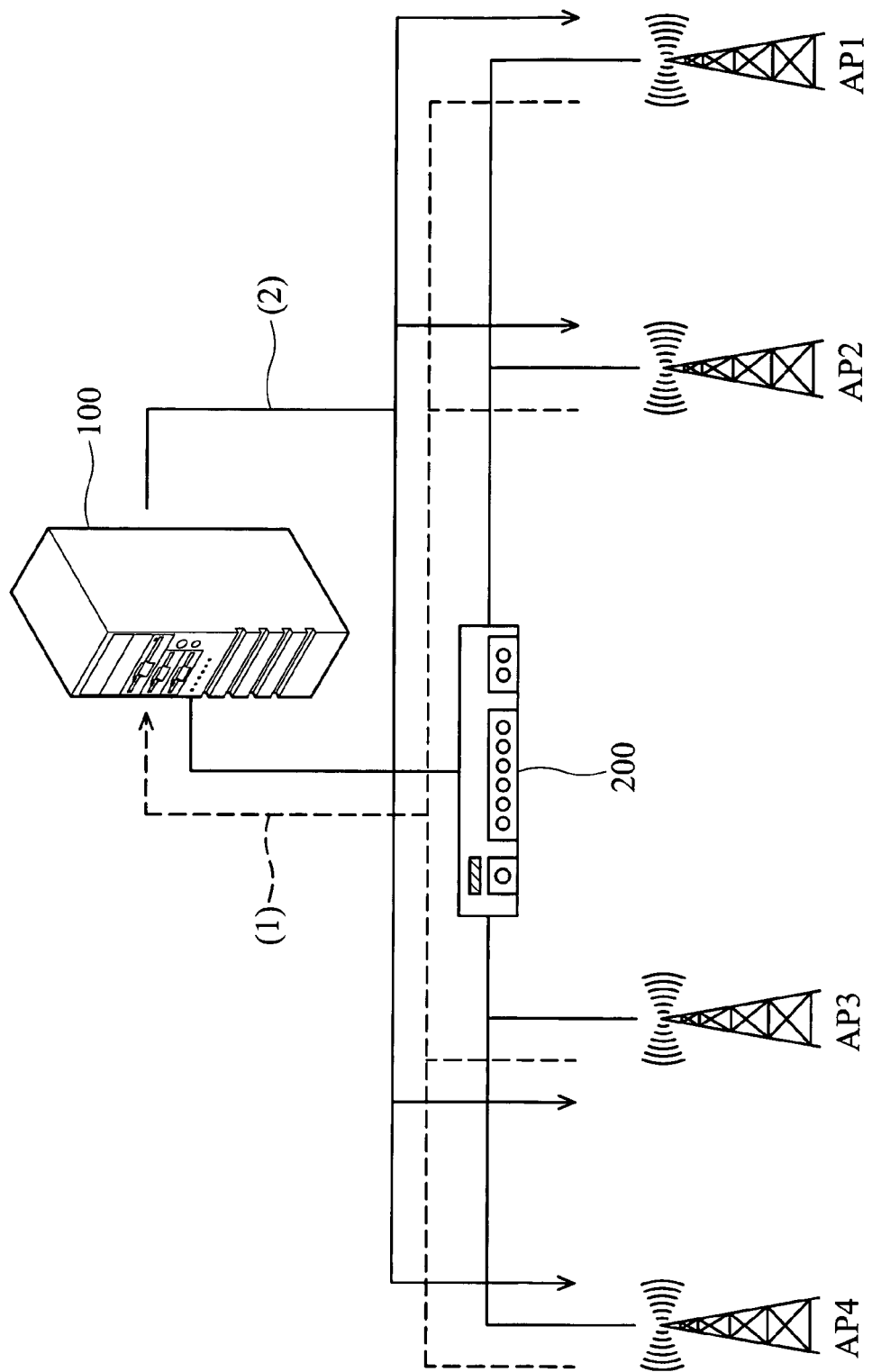
FIG. 2A is a schematic view of an embodiment of a system of dynamic channel allocation for access points in wireless networks.

FIG. 2A is a schematic view of an embodiment of a system of dynamic channel allocation for access points in wireless networks.

Figure 2B:
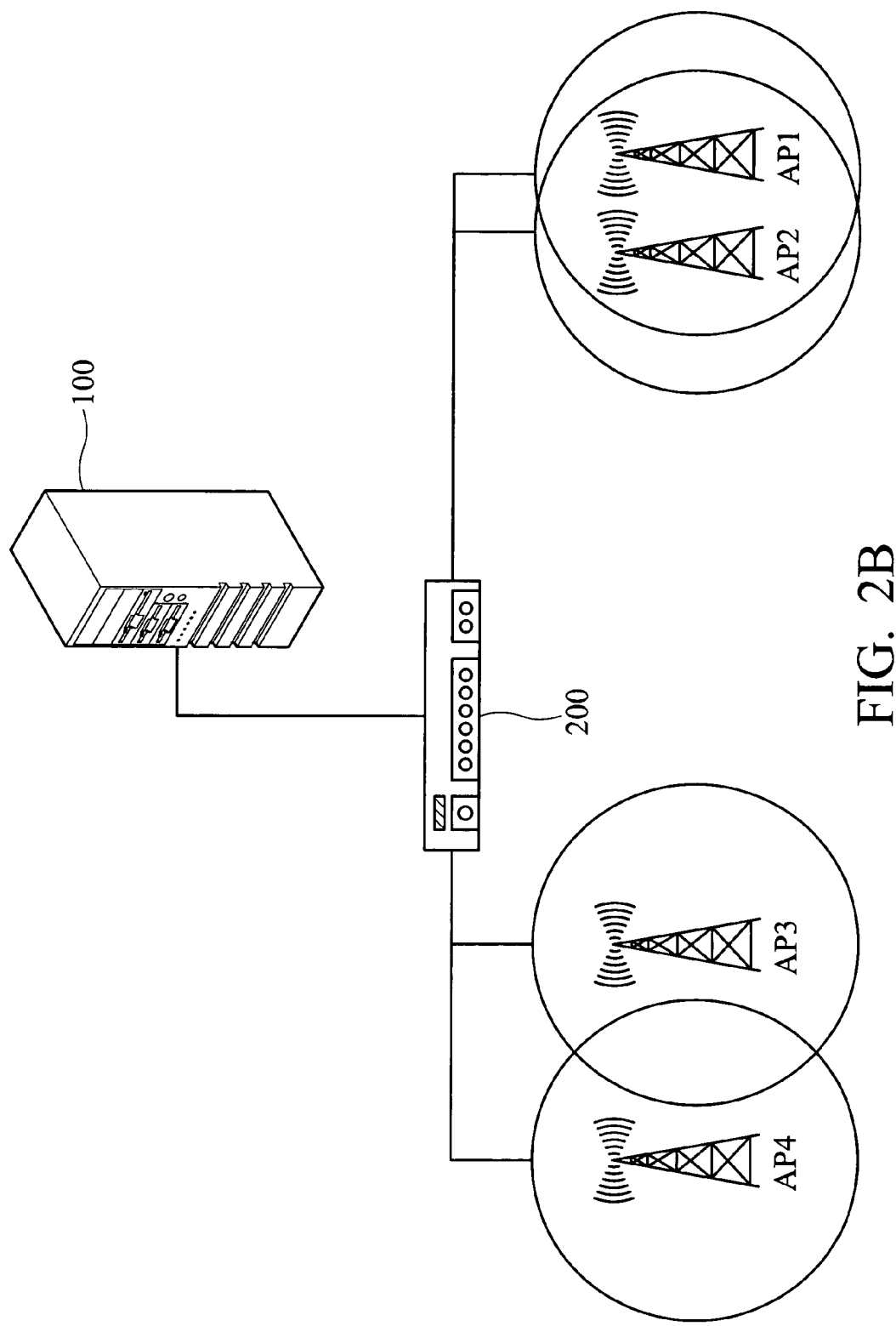
FIG. 2B is a schematic view of an embodiment of relative locations for access points in a local area network.

A network structure of an embodiment of the invention comprises a dynamic channel allocation (DCA) server 100 and a hub (or switch) 200, serving as a bridge between a DCA server and access points. In practice, a DCA server 100, combined with a dynamic host configuration protocol (DHCP) server, associates with access points AP1~AP4 via hub (or switch) 200. Referring to FIG. 2B, in a wireless network comprising access points AP1~AP4 complying with IEEE 802.11b communication standards, access points AP1~AP4 can communicate with each other via hub (or switch) 200 complying with Ethernet standards. DCA server 100 gathers communication information of each access point (operation (1) shown in FIG. 2A), derives a network topology formed by the access points according to the communication information, calculates switch channel indexes for each access point according to the communication information and network topology, and determines desired access points for switching channels according to the switch channel indexes (operation (2) shown in FIG. 2A), details of which are further described in the following.

The communication information comprises a packet loss ratio, packet reception and transmission time, mutual scan information between access points, and association and disassociation records of an access point. Signal interference or high data load causes transmission failure and access points can calculate packet loss ratio during packet transmission according to packet retransmission timeout. The degree of interference is determined according to the packet loss ratio. The packet reception and transmission time indicates the packet load for an access point. Current IEEE 802.11 communication standards support multi-rate transmission, such that an access point transmits packets using different transmission rates. Thus, embodiments of the invention represent the data load for an access point with packet reception and transmission time instead of data amount, details of which are further described in the following.

A network topology is created according to the mutual scan information between access points. In this embodiment of the invention, an access point can translate an operating mode thereof as a client mode (i.e., taking itself as a mobile host) and implement an active scan operation to determine neighbor access points directly resulting in interference. The active scan operation can be performed by sending out probe frames. Association and disassociation records for mobile hosts complement mutual scan information to form a network topology. One access point may not detect another because the former one is outside the transmission range of the later but basic service areas (BSAs) thereof overlap, resulting in interference. To determine such interference states, association and disassociation records for mobile hosts must be gathered, details of which further described in the following.

Gathered communication information is periodically returned to DAC server 100.

Figure 1B:
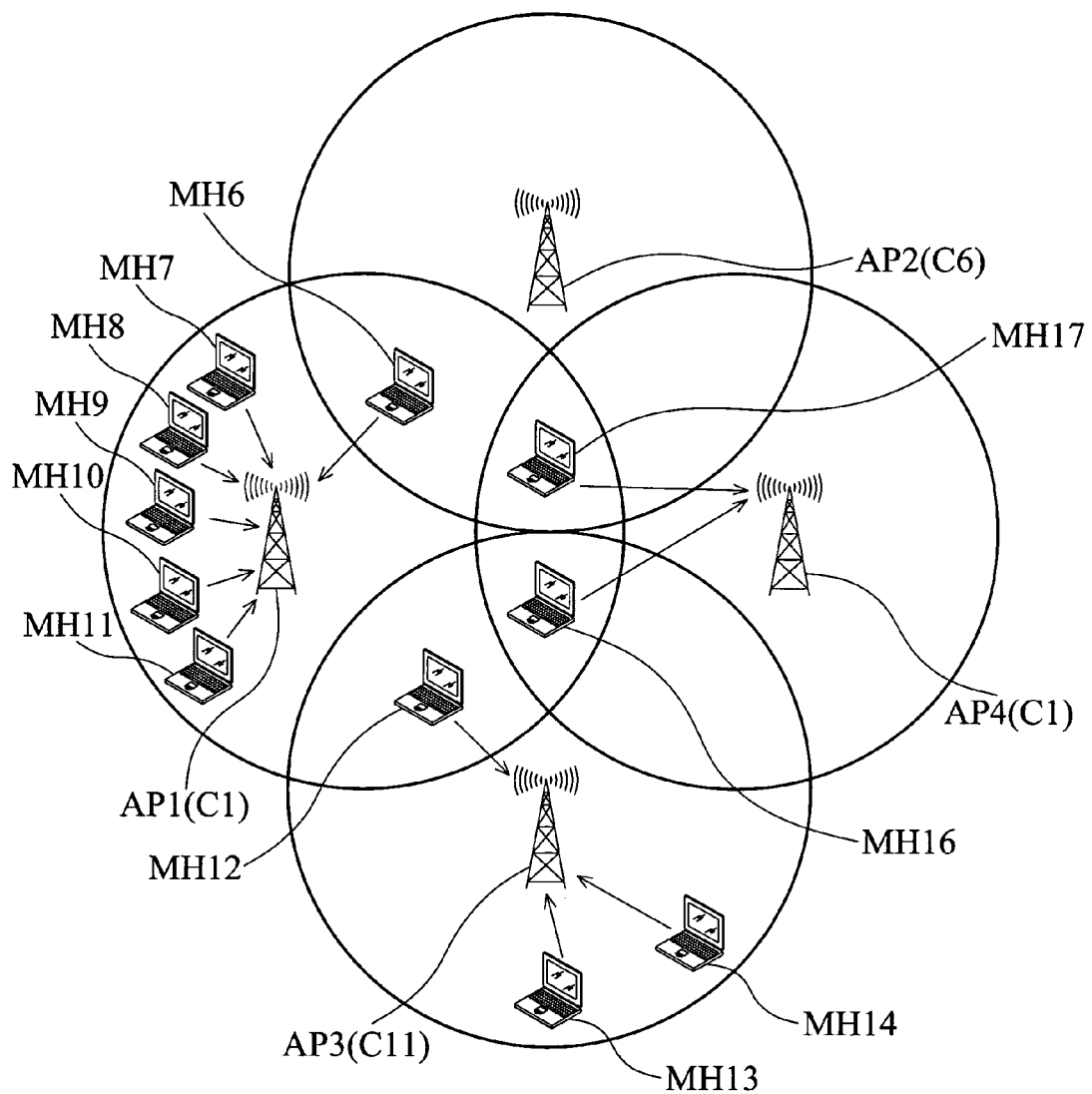
Figure 2C:
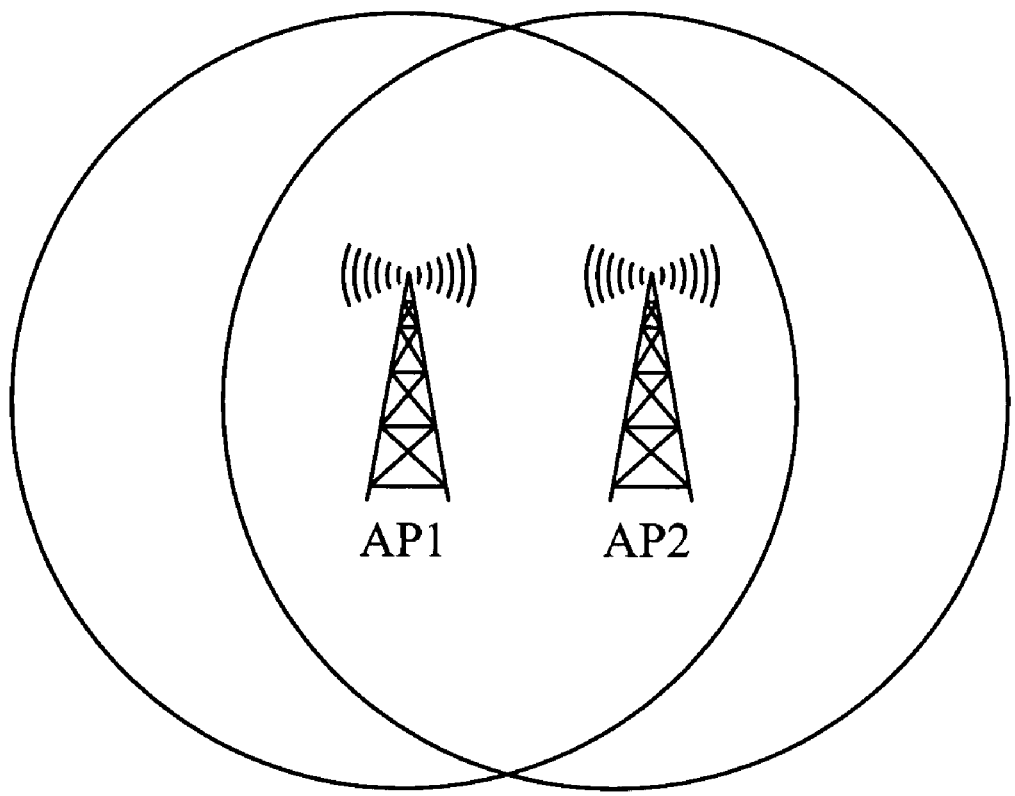
FIG. 2C is a schematic view of an embodiment of relative locations for two access points in a local area network, in which the two access points directly interfere with each other.
Figure 2D:
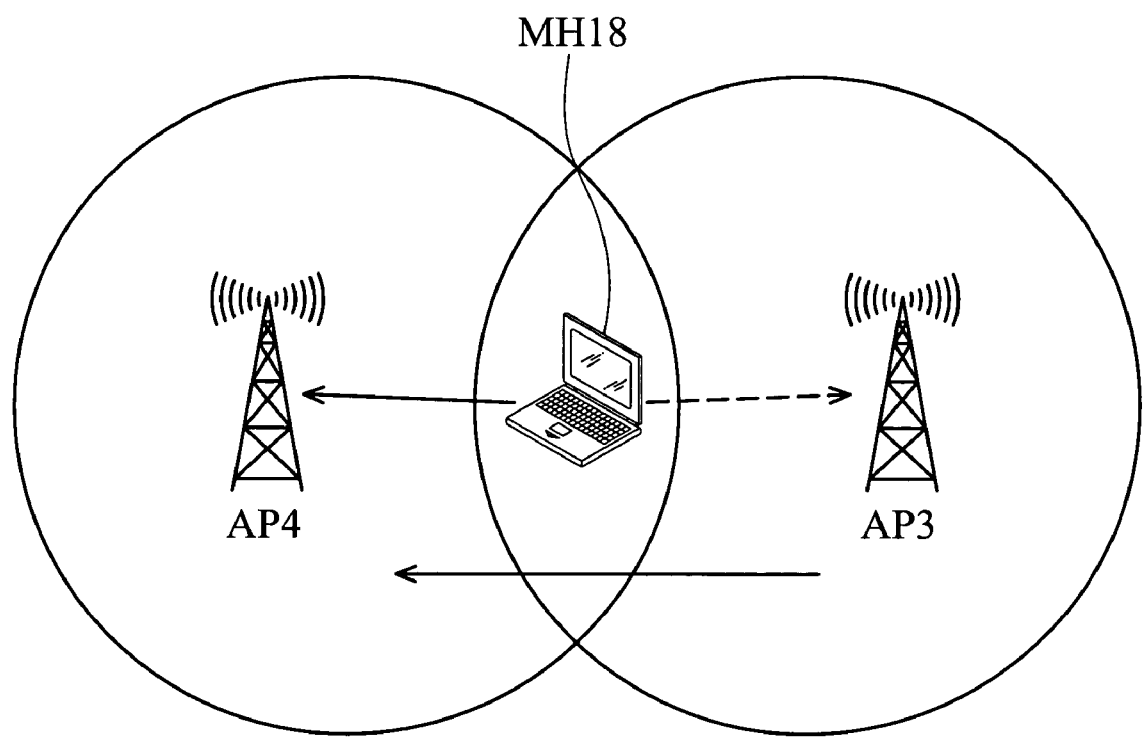
FIG. 2D is a schematic view of an embodiment of relative locations for two access points in a local area network, in which the two access points indirectly interfere with each other.

FIG. 2C is a schematic view of an embodiment of relative locations for two access points in a local area network, in which the two access points directly interfere with each other. FIG. 2D is a schematic view of an embodiment of relative locations for two access points in a local area network, in which the two access points indirectly interfere with each other. DAC server 100 of an embodiment of the invention constructs a network topology according to relative locations of access points, as shown in FIG. 1, implemented according to mutual scan information and association and disassociation records of access points.

IEEE 802.11 communication standards define active and passive scan methods, enabling one access point can detect another access point under an infrastructure mode. Active scan allows an access point to actively transmit a probe request packet. When another access point receives the probe request packet, indicating it is located within transmission coverage of the former access point, the access point replies with a probe reply packet to the former access point. Referring to FIG. 2C, for example, access points AP1 and AP2 are located within transmission coverage of the other side (i.e. directly interfering with each other). Access point AP1 translates an operating mode thereof as a client mode (i.e. taking itself as a mobile host) and transmits a probe request packet. When access point AP2 receives the probe request packet, it replies with a probe reply packet to access point AP1, indicating access point AP2 is a neighbor to access point AP1 (within transmission coverage). Passive scan allows access point AP1 to detect a neighbor, access point AP2, when the access point AP1 receives a beacon from access point AP2. Access point AP1 does not directly transmit any message to other access points. The described scan process determines whether directly neighboring access points exist.

Referring to FIG. 2D, access points AP3 and AP4 are not located within transmission coverage of the other side (i.e. indirectly interfering with each other). Transmission coverage thereof overlap each other, and, if there is a mobile host inside the overlapping transmission coverage, the mobile host receives both signals from access points AP3 and AP4 and interference occurs. Thus, relative locations of each access point in a network topology must be acquired to determine whether such interference exists. Embodiments of the invention obtain relative location information of each access point according to association and disassociation records thereof. As shown in FIG. 2D, mobile host MH18 associates with access point AP3 and moves to transmission coverage of access point AP4 for association thereto. As previously described, mobile host MH18 disassociates from access point AP3 and reassociates with access point AP4, and access points AP3 and AP4 must record occurrence times of such events and a media access control (MAC) address of mobile host MH18, reported to DAC server 100 via hub (or switch) 200, as shown in FIG. 2A. Accordingly, DCA server 100 can acquire relative locations of each access point. The described process refers to the gathered information to determine whether indirectly neighboring access points exist.

Embodiments of the invention define a switch channel index (SCI) for determining the time to switch and allocate channels. An SCI can respond to interference and load states of an access point, an equation thereof is defined as follows:

$$SCI = \frac{PLR}{1 - \frac{RT + TrT}{TCT}},$$

where PLR indicates packet loss rate, RT indicates receive time, TrT indicates transmit time, TCT indicates total communication time, an amount of receiving time, transmitting time, and idle time. Additionally, the PLR responds to interference states of an access point and the $$\frac{RT + TrT}{TCT}$$

responds with load states thereof. In an embodiment of the invention, the packet load is estimated according to data transmission time instead of data load. Data transmission, for example, lasts 7 seconds during a data process lasting 10 seconds. An SCI increases that indicates greater signal interference (resulting in greater packet loss ratio) or the data load, thereby requires a channel switch.

Since two access points are located as shown in FIG. 2C, request to send (RTS)/clear to send (CTS) packet switching therebetween decreases packet loss ratio therefor. Thus, embodiments of the invention provide a channel load concept, calculated using the same method as the data load for access points. When two access points are located as shown in FIG. 2C and are allocated the same channel, the amount of the channel load of the allocated channel is the addition of each channel load thereof. Thus, an access point is to be determined and allocated a channel with a lighter channel load if required.

Figure 3:
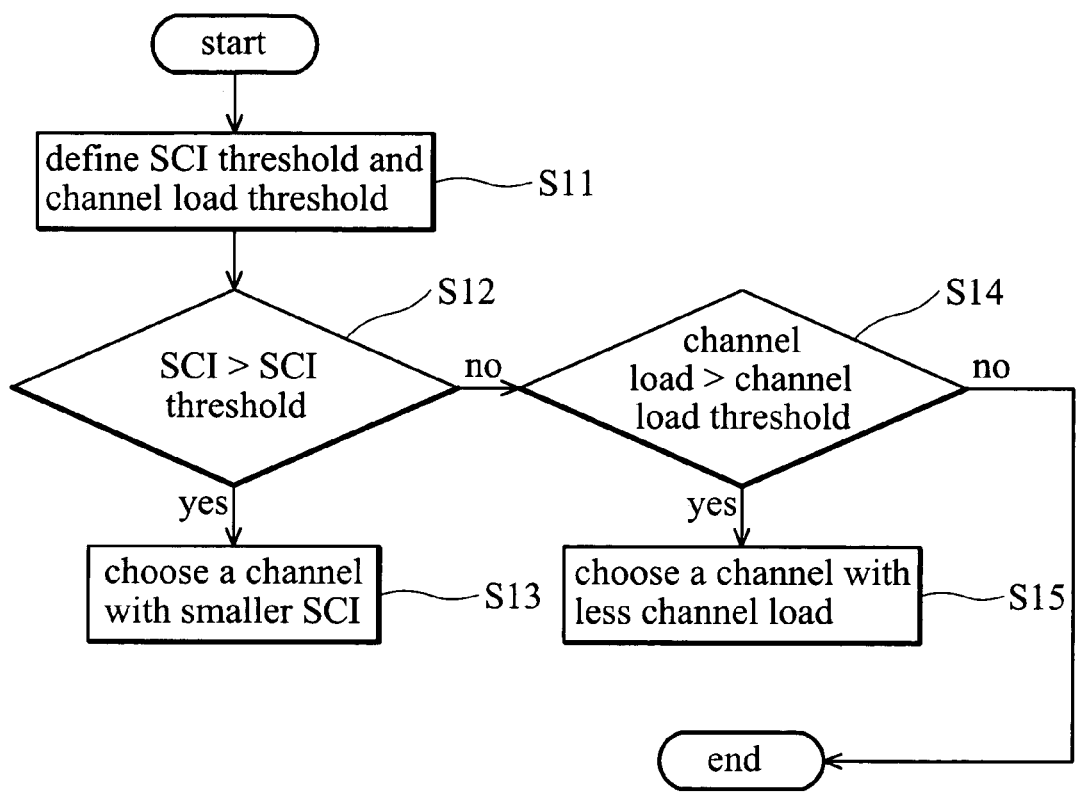
FIG. 3 is a flowchart of an embodiment of a method of channel allocation determination.

FIG. 3 is a flowchart of an embodiment of a method of channel allocation determination, determining whether to switch channels according to SCI and the channel load. An SCI threshold and the channel load threshold are defined (step S11). It is determined whether an SCI of the access point is greater than the SCI threshold (step S12), and, if so, the process proceeds to step S13, and, if not, to step S14. If the SCI is greater than the SCI threshold, indicating the access point suffers from greater interference with requiring switch channel, a channel with a smaller SCI is determined to be allocated to the access point (step S13). If the SCI is smaller than the SCI threshold, it is then determined whether the channel load for an allocated channel to the access point is greater than the channel load threshold (step S14), and, if so, the process proceeds to step S15, and, if not, the process concludes. If the channel load is greater than the channel load threshold, indicating a heavier channel load for the allocated channel to the access point, a channel with the lighter channel load is determined to be allocated to the access point (step S15).

When channels allocated to access points are determined to be switched, which channel allocated to one access point is then determined, using a processing method similar to SCI calculation. Switch channel indexes of each available channel is calculated according to gathered information and a network topology formed by access points and a channel with a smallest SCI is allocated to a desired access point.

Figure 4:
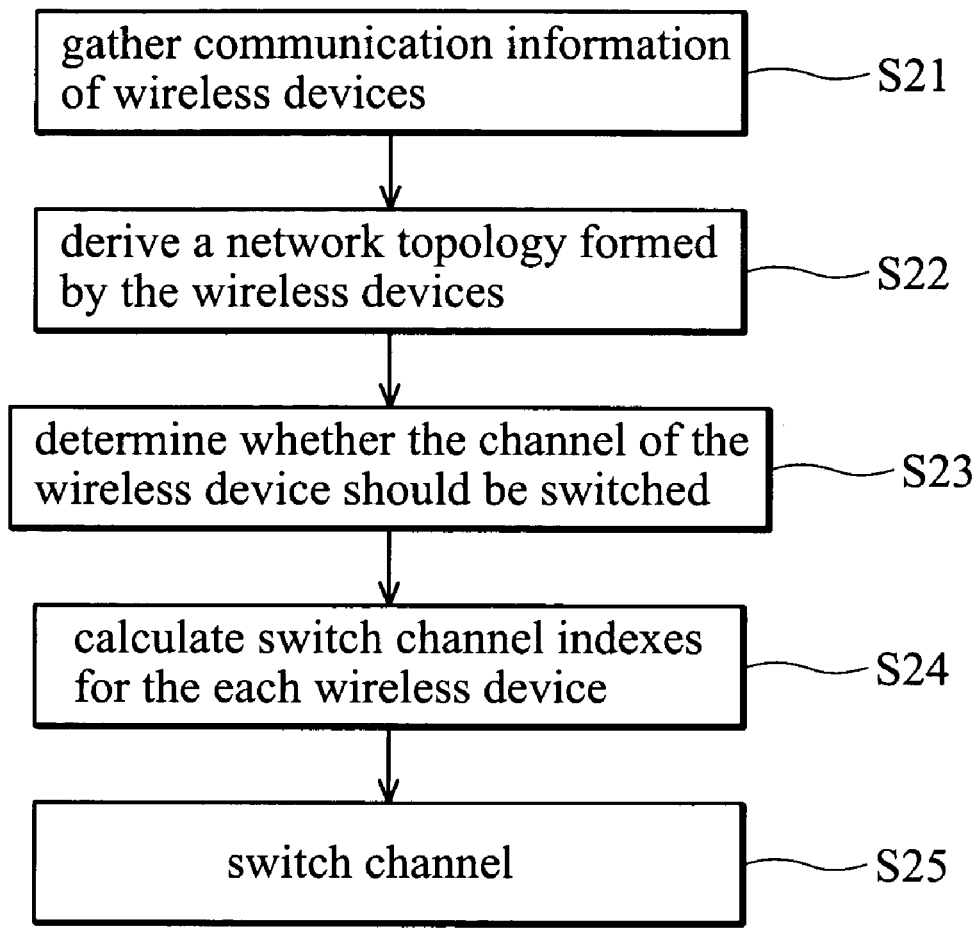
FIG. 4 is a flowchart of an embodiment of a method of dynamic channel allocation for access points in wireless networks.

FIG. 4 is a flowchart of an embodiment of a method of dynamic channel allocation for access points in wireless networks.

Communication information reported by access points is gathered (step 21), comprising packet loss ratios, packet reception and transmission time, interaction scan information, and association and disassociation records. Next, a network topology formed by the wireless devices is derived according to the communication information (step 22), acquiring information related to direct and indirect neighbor to each access point. Access points that require switching channel are determined (step 23) and switch channel indexes for each available channels are calculated (step 24) according to the communication information and network topology. A channel with a smaller SCI is allocated to a desired access point (step 25).

Figure 5:
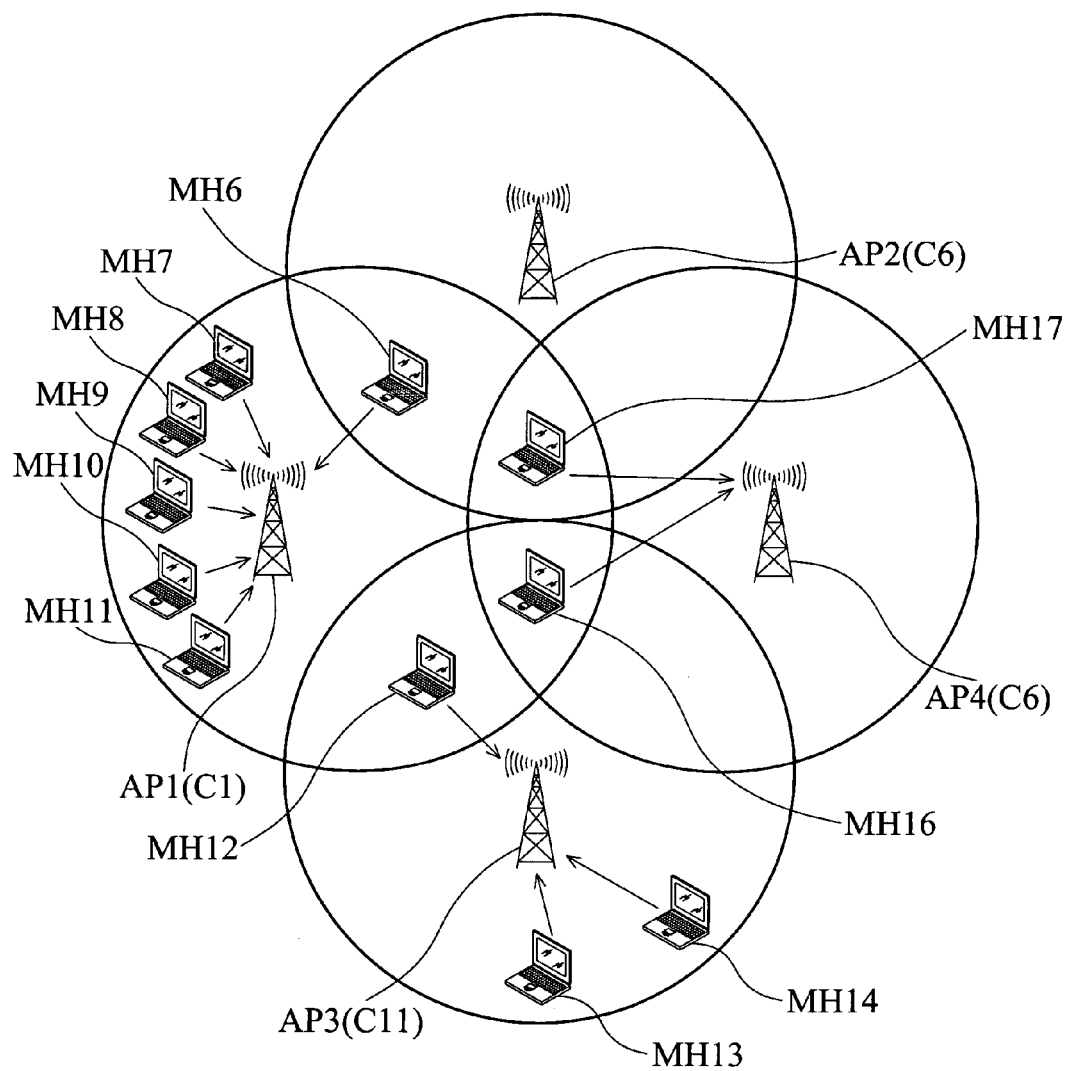
FIG. 5 is a schematic view of an embodiment of channel allocation for access points.

FIG. 5 is a schematic view of an embodiment of channel allocation for access points. To compare with FIG. 1B, when mobile hosts MH7~MH11 disassociate with access point AP2 and associate with access point AP1, no mobile host is presently associated to access point AP2 and the load of access point AP1 increases. Additionally, interference may occur due to the same channel is allocated to access points AP1 and AP4. Thus, using dynamic channel allocation method of the invention allocates the same channel as allocated to access point AP2, thereby no interference between access points AP1 and AP4 occurs. Although access points AP2 and AP4 use the same channel (CH6) with no mobile host associated to access point AP2, the data load of access point AP2 and the channel load of channel CH6 are low. Accordingly, performance is not affected.

Embodiments of the invention determine appropriate channels for allocation to at least one desired access point to be switched, reducing interference between access points. Additionally, a DCA server is located in the wired LAN, only applicably modified with a software application applied to the access points, to provide functions described above to achieve the purposes of the invention. Further, an available channel to be allocated is determined according to the channel load in addition to the interference and data load.

Although the present invention has been described in preferred embodiments, it is not intended to limit the invention thereto. Those who are skilled in this technology can still make various alterations and modifications without departing from the scope and spirit of this invention. Therefore, the scope of the present invention shall be defined and protected by the following claims and their equivalents.

What is claimed is:

1. A system of dynamic channel allocation for access points in a wireless network, comprising a plurality of wireless devices, each allocated with a communication channel, the system comprising:

an allocating server, gathering communication information of each wireless device, deriving a network topology formed by the wireless devices according to the communication information, calculating switch channel indexes for the each wireless device according to the communication information and network topology, determining desired wireless devices for switching channels according to the switch channel indexes, and further calculates switch channel indexes corresponding to each communication channel according to the communication information and network topology, and chooses a channel with a minimum SCI for allocation to the wireless device wherein the allocating server determines, according to an SCI of a wireless device or the channel load of a channel allocated to the wireless device, whether the channel of the wireless device has to be switched; wherein the allocating server determines to switch the channel of the wireless device if the SCI is greater than an SCI threshold or the channel load of the channel of the wireless device is greater than a channel load threshold.

2. A system of dynamic channel allocation for access points in a wireless network, comprising at least one first, second, third, and fourth wireless devices, each is allocated a first, second, third, and fourth communication channels respectively, wherein the first, second, third, and fourth communication channels do not interfere with each other and the first communication channel is identical to the second communication channel, the system comprising:

an allocating server, connecting to the wireless devices through a hub, gathering communication information of each wireless device, deriving a network topology formed by the wireless devices according to the communication information, calculating a first, second, third, and fourth switch channel indexes for the each wireless device according to the communication information and network topology, and, when the first SCI is greater than a SCI threshold, determining to allocate the third or fourth communication channel to the first wireless device wherein the allocating server determines the allocate the third or fourth communication channel to the first wireless device when the SCI is greater than the SCI threshold of the channel load of the first communication channel is greater a channel load threshold; wherein the allocating server further calculates the third and fourth switch channel indexes according to the communication information and network topology, and determines to allocate the third communication channel to the first wireless device when the third SCI is smaller than the fourth SCI.

3. The system of dynamic channel allocation as claimed in claim 2, wherein the communication information comprises a packet loss ratio during packet transmission for a wireless device, calculated according to packet retransmission timeout.

4. The system of dynamic channel allocation as claimed in claim 3, wherein the communication information comprises packet reception and transmission time during packet transmission for the wireless device, indicating the packet load for the wireless device.

5. The system of dynamic channel allocation as claimed in claim 4, wherein the communication information comprises mutual scan information between any two wireless devices, determining whether transmission coverage of one wireless device overlaps the other.

6. The system of dynamic channel allocation as claimed in claim 5, wherein the communication information comprises association and disassociation records of a wireless device.

7. A method of dynamic channel allocation for access points in a wireless network, comprising a plurality of wireless devices, each allocated with a communication channel, the method comprising:

gathering communication information of each wireless device;
deriving a network topology formed by the wireless devices according to the communication information;
calculating switch channel indexes for the each wireless device according to the communication information and network topology;
determining desired wireless devices for switching channels according to the switch channel indexes;
calculating switch channel indexes corresponding to each communication channel according to the communication information and network topology; and
chooses a channel with a minimum SCI for allocation to the wireless device wherein the channel switch further determines, according to an SCI of a wireless device or the channel load of a channel allocated to the wireless device, whether the channel of the wireless device is switched; wherein the channel of the wireless device is switched if the SCI is greater than an SCI threshold of the channel load of the channel of the wireless device is greater than a channel load threshold.

8. The method of dynamic channel allocation as claimed in claim 7, wherein the communication information comprises a packet loss ratio during packet transmission for a wireless device, calculated according to packet retransmission timeout.

9. The method of dynamic channel allocation as claimed in claim 8, wherein the communication information comprises packet reception and transmission time during packet transmission for the wireless device, indicating the packet load for the wireless device.

10. The method of dynamic channel allocation as claimed in claim 9, wherein the communication information comprises mutual scan information between any two wireless devices, determining whether transmission coverage of one wireless device overlaps another wireless device.

11. The method of dynamic channel allocation as claimed in claim 10, wherein the communication information comprises association and disassociation records of a wireless device.

12. A wireless network, comprising:
   a plurality of wireless devices, each allocated with a communication channel;
   a hub; and
   an allocating server, connecting to the wireless devices through a hub, gathering communication information of each wireless device, deriving a network topology formed by the wireless devices according to the communication information, calculating switch channel indexes for each wireless device according to the communication information and network topology, determining desired wireless devices for switching channels according to the switch channel indexes, and further calculates switch channel indexes corresponding to each communication channel according to the communication information and network topology, and chooses a channel with a minimum SCI for allocation to the wireless device wherein the allocating server determines, according to an SCI of a wireless device or the channel load of a channel allocated to the wireless device, whether the channel of the wireless device has to be switched; wherein the allocating server determines to switch the channel of the wireless device if the SCI is greater than an SCI threshold of the channel load of the channel of the wireless is greater than a channel load threshold.

* * * * *